United States Patent
Senger

(10) Patent No.: US 6,547,186 B2
(45) Date of Patent: Apr. 15, 2003

(54) DEVICE FOR RAISING AND LOWERING THE PASSENGER DOOR OF AN AIRCRAFT

(75) Inventor: Stefan Senger, Holzheim (DE)

(73) Assignee: Eurocopter Deutschland GmbH, Donauworth (DE)

(*) Notice: Subject to any disclaimer, the term of this patent is extended or adjusted under 35 U.S.C. 154(b) by 0 days.

(21) Appl. No.: 10/188,041

(22) Filed: Jul. 3, 2002

(65) Prior Publication Data

US 2003/0006343 A1 Jan. 9, 2003

(30) Foreign Application Priority Data

Jul. 4, 2001 (DE) .......................... 101 32 361

(51) Int. Cl.[7] ................................. B64C 1/14
(52) U.S. Cl. .................. 244/129.5; 49/254; 49/246; 49/247; 49/149
(58) Field of Search ............ 244/129.5, 129.4; 49/254, 149, 236, 246, 247, 248, 249

(56) References Cited

U.S. PATENT DOCUMENTS

| | | | | |
|---|---|---|---|---|
| 3,647,169 A | * | 3/1972 | Allwright et al. | 244/129.5 |
| 5,305,969 A | * | 4/1994 | Odell et al. | 244/129.5 |
| 5,316,241 A | * | 5/1994 | Kallies et al. | 244/129.5 |
| 6,168,114 B1 | * | 1/2001 | Erben | 244/129.5 |
| 6,457,674 B2 | * | 10/2002 | Erben et al. | 244/129.5 |

FOREIGN PATENT DOCUMENTS

| | | |
|---|---|---|
| DE | 19702085 | 7/1998 |
| DE | 19845917 | 4/2000 |
| DE | 19948844 | 4/2001 |
| DE | 10020825 | 11/2001 |

\* cited by examiner

Primary Examiner—J. Woodrow Eldred
(74) Attorney, Agent, or Firm—Crowell & Moring LLP

(57) ABSTRACT

A device for opening a passenger door of an aircraft includes a supporting arm connected movably to the fuselage frame, a wishbone connecting the support arm to the passenger door, a first journal rotatably connecting the wishbone to the support arm, and a lifting mechanism. The lifting mechanism includes a lifting shaft for raising and lowering the door, a lowering safety shaft, a controllable drive engaged with the lowering safety shaft to rotate lowering safety shaft, and a lowering safety link. The lifting shaft includes two ends and a roller lever disposed at each end, wherein when the passage door is in the closed position, each roller lever engages a fuselage frame mounting. The lowering safety shaft includes an end and a roller lever disposed at the end. The lowering safety shaft is engaged with the lifting shaft. The lowering safety link includes a second journal having an elongated configuration. The second journal has a link track, and the roller of the lowering safety shaft is guided on the link track of the second journal.

7 Claims, 2 Drawing Sheets

DEVICE FOR RAISING AND LOWERING THE PASSENGER DOOR OF AN AIRCRAFT

This application claims the priority of German Patent Document No. 101 32 361.1, filed Jul. 4, 2001, the disclosure of which is expressly incorporated by reference herein.

BACKGROUND AND SUMMARY OF THE INVENTION

The passenger door of an aircraft is connected to a supporting arm by one or more wishbones. The supporting arm has at least two journals, and the wishbones are fastened to the journals. The supporting arm is also movably connected with the fuselage frame. A lifting device for raising and lowering the door includes at least one lifting shaft having roller levers at its ends. In the closed position of the door, each of the roller levers is braced in a fuselage frame mounting.

The process for opening the passenger door includes the following steps. A locking mechanism is unlocked when the door is still in the closed position. The lifting device, connected to a drive device, is then unlocked, and the door is raised using the lifting device to end the closed position of the door. The door is in the raised state even before the door is opened. Subsequently a swiveling mechanism swivels the door along a lifting track into an end position of the opening process at the end of the lifting track. The swiveling of the door takes place with the door in the raised state. During the swiveling motion and at the end position, the weight of the entire door must be supported. This holding of the door leads to an increased stress on the connecting device between the door and the supporting arm. The connecting device includes at least two wishbones spaced vertically from each other. The swiveling motion and/or wind load cause additional stresses in the connecting device. In addition, vibrations may cause the lifting mechanism to lower the door, and a lowered, opened door will delay the subsequent closing of the door.

An object of the invention is to secure a door in the raised state during the swiveling motion and at the end position of the opening.

The objective is accomplished according to certain preferred embodiments of the invention by providing a passenger door of an aircraft which has a device for opening the door. The device includes a supporting arm connected movably to the fuselage frame, a wishbone connecting the support arm to the passenger door, a first journal rotatably connecting the wishbone to the support arm, and a lifting mechanism. The lifting mechanism includes a lifting shaft for raising and lowering the door, a lowering safety shaft, a controllable drive engaged with the lowering safety shaft to rotate lowering safety shaft, and a lowering safety link. The lifting shaft includes two ends and a roller lever disposed at each end, wherein when the passage door is in the closed position, each roller lever engages a fuselage frame mounting. The lowering safety shaft includes an end and a roller lever disposed at the end. The lowering safety shaft is engaged with the lifting shaft. The lowering safety link includes a second journal having an elongated configuration. The second journal has a link track, and the roller of the lowering safety shaft is guided on the link track of the second journal.

The passenger door of an aircraft is connected with a supporting arm by one or more wishbones. The supporting arm has at least two journals. A wishbone is attached to each journal. A lowering safety link, preferably lying in the axis of rotation of the upper and lower wishbones, is displaceable on an extended, elongated journal of the upper wishbone. The lifting device for raising and lowering the door comprises at least one lifting shaft having roller levers at its ends. In the closed position of the door, each of the roller levers is braced in a fuselage frame mounting. The lifting shaft is engaged with the lowering safety link by a speed-transforming gear. The lowering safety link includes a roller lever on its end, and the roller is in engagement with the lowering safety link that is arranged on the journal. The roller of the roller lever of the lowering safety shaft is guidable in the link track of the lowering safety link. The roller of the roller lever has a peripheral groove which engages a rail arranged preferably centrally in the link track.

The invention prevents vibrations from causing a lowering of the lifting shaft when the door is swiveled open and is at the end position of the opening process.

Other objects, advantages and novel features of the present invention will become apparent from the following detailed description of the invention when considered in conjunction with the accompanying drawings.

DETAILED DESCRIPTION OF THE DRAWINGS

Figure 1:
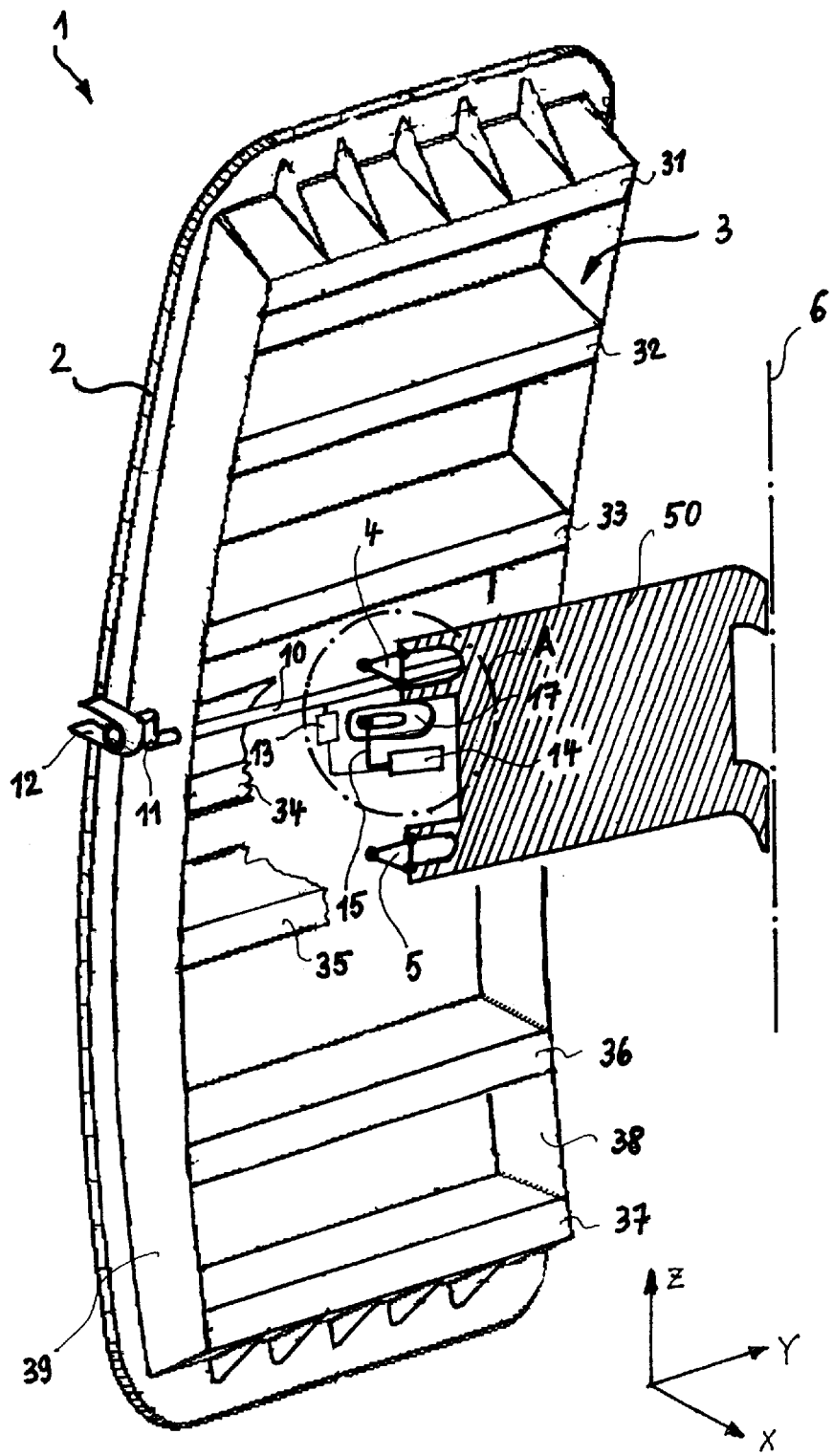
FIG. 1 presents a schematic representation of details of a passenger door with supporting arm.

FIG. 1 shows schematically a passenger door 1 that includes an outer shell 2 and a door framework 3. The view is from the cabin interior. The description begins with the door in the lowered state. The door 1 includes structurally a door framework 3, which is connected with an exterior shell 2 that can be subjected to pressure. For reasons of clarity, further components and subassemblies for door kinematics are dispensed with in FIG. 1.

The door framework 3 has a large number of supports 31, 32, 33, 34, 35, 36, 37 which are arranged spaced from one another in the fuselage circumferential direction. The door 1 has a rotatable lifting shaft 10 mounted in the door framework. The ends of the lifting shaft 10 are guidable in and out of a fuselage mounting 12. The lifting shaft 10 is engaged with a lowering safety shaft 15 by a speed-transforming gear 13, and the lowering safety shaft 15 is connected with a drive device 14. The lowering safety shaft 15 is in engagement with a lowering safety link 17 which is connected with the upper wishbone 4 on the supporting arm. This lowering safety link 17 functions against an unintended lowering of the door 1 during the swiveling motion of the lifted door 1 and when the door is at the end position of the door opening process.

Further details will be explained in connection with FIG. 2, which provides a view of the region of the upper wishbone 4, the supporting arm 50, and the lowering safety link 17.

The connecting device between the door 1 and the supporting arm 50 has two wishbones 4, 5 spaced vertically from each other, which are connected with the door framework 3 and with the supporting arm 50. The supporting arm 50 is mounted to, and held rotatably in an axis of rotation 6, in the fuselage frame of the aircraft. The upper wishbone 4 and the lower wishbone 5 have a common swiveling axis 7 in an imaginary extension of their axes (see FIG. 2). The swiveling axis 7 of the upper wishbone 4 is formed by a journal 8 and an analogous arrangement can be found on the lower wishbone 5. The journal 8 engages with a bearing sleeve 9, which makes the swiveling of the wishbone possible and enables the raising and lowering of the wishbone. The upper and lower wishbones 4, 5 are connected with the door framework 3.

Figure 2:
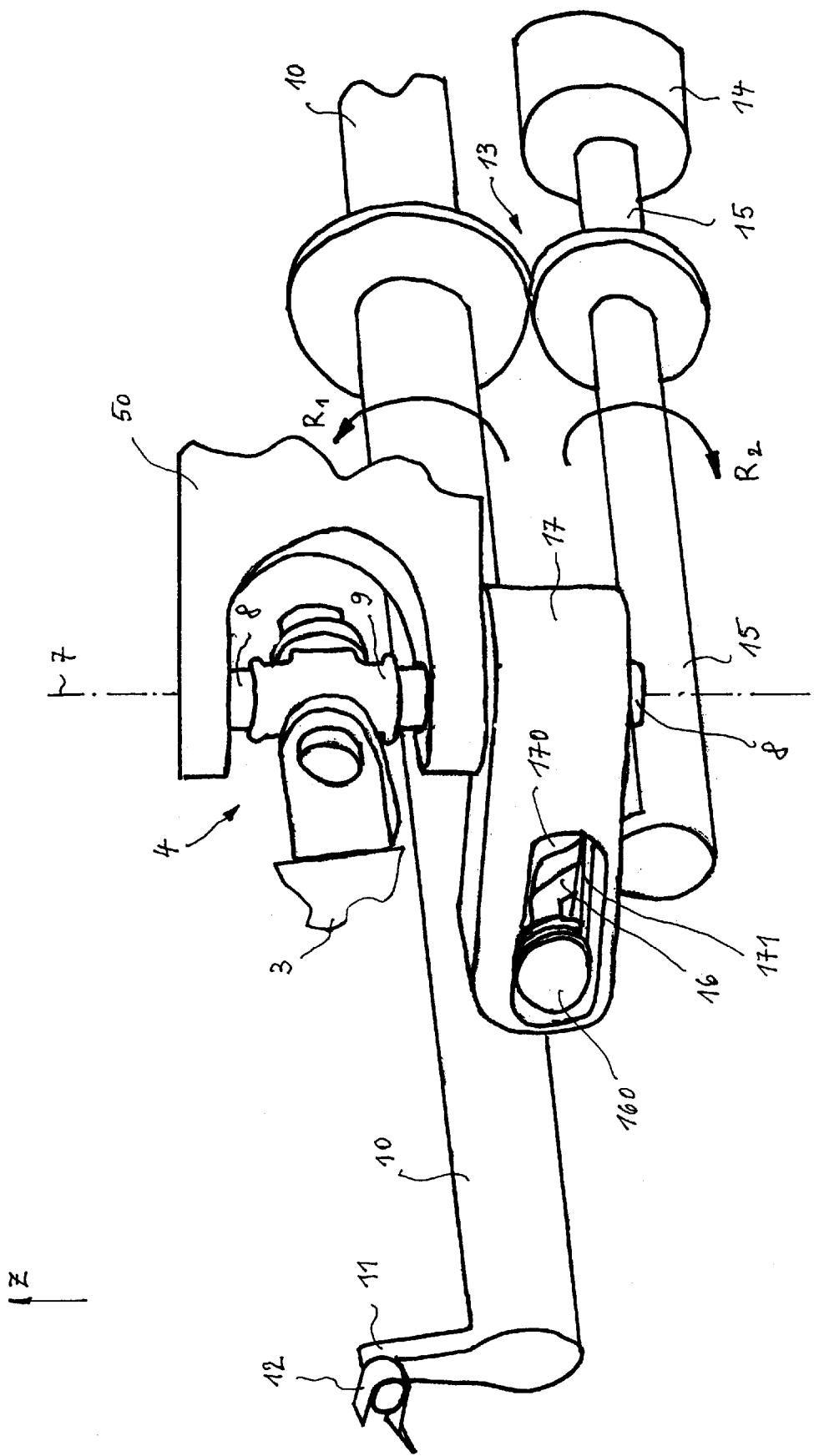
FIG. 2 provides a representation of the lowering-safety link with lowering safety shaft in the lowered state of the door.

Furthermore, as shown in FIGS. 1 and 2, a lifting shaft 10 is provided which is guided in the door framework 3 and which has a roller lever 11 at each of its ends. The roller lever 11 is guidable in the fuselage mounting 12 at the closed position of the door. The lifting shaft 10 is coupled with a drive device 14 (for example a controllable electric motor) by a speed-transforming gear 13. The drive device is coupled to a lowering safety shaft 15, which is mounted in the door framework 3 and has a roller lever 16 on its end. This roller lever 16 of the lowering safety shaft 15 is in engagement with a lowering safety link 17. The lowering safety link 17 has an oblong hole (this is the link track 170), in which the roller lever 16 of the lowering safety shaft 15 can be guided. The coupling of the lowering safety link 17 with the lowering safety shaft 15 takes place through a positive locking motion. The lowering safety link 17 is arranged rotatably on an extension of the journal 8 of the wishbone 4.

A rail 171 is disposed in the middle of the link track 170 of the lowering safety link 17. The rail 171 is enclosed by both sides of the roller 160 of the roller lever 16 of the lowering safety shaft 15. In this way, lateral forces can be transferred during the swiveling of the door 1 from the roller 160 of the roller lever 16 of the lowering safety shaft 15 to the lowering safety link 17.

From the lowered position of the door in the closed state, one of the operations in connection with the opening of the door is the lifting of the door 1 out of the lowered state into a completely raised state. The lifting of the door takes place along an established lifting track.

The aircraft door is lifted by rotating the lifting shaft 10 and the lowering safety shaft 15 by approximately 180°. If the drive device 14 is controlled by a control unit to rotate the lowering safety shaft 15 in the direction of arrow $R_2$, then the lifting shaft 10 is rotated in the direction of rotation in accordance with arrow direction $R_1$ by the speed-transforming gear 13. The rotations of the lifting shaft 10 and lowering safety shaft 15 are in opposite directions. FIG. 2 shows the positions of the lifting shaft 10 and lowering safety shaft 15 still in the lowered state. In the completely lifted state of the door, the lifting shaft 10 is swiveled and positioned above a plane of the frame mounting 12, and the lowering safety shaft 15 is swiveled and positioned above a plane of the link track 170. In the raised state, a roller lever 11 of the lifting shaft 10 and the roller lever 16 of the lowering safety shaft 15 have in each case lifted half the length of the entire lifting height of the door.

If these two shafts (the lifting shaft 10 and the lowering safety shaft 15) rotate in the directions of the arrows $R_1, R_2$, the door moves in the Z direction. In the "completely lifted" state, the lifting shaft 10 and the lowering safety shaft 15 are nonetheless not precisely in the extended position of 180°, but at about 182°, so that the lowering safety shaft 15 is at an over-center position. This means that the door moves into a stable equilibrium or a stable state through its own weight. Vibrations on the door now no longer cause the lowering safety shaft 15 or the lifting shaft 10 to move to a lowering process. The end position of the lifting of the lowering safety shaft 15 is defined by a stop (not represented).

The swiveling of the door takes place after the door has been raised. With this swiveling motion, the rollers of the roller levers 11 of the lifting shaft 10 disengage with the door framework mounting 12. The door is held in place by the wishbones 4, 5, while swinging over into an end position of the opening process.

The lowering safety link 17 of the invention improves the ability of the supporting arm to bear loads and prevents an unintended lowering of the door while the door swings into the end position of the opening process.

The invention is so configured that the lowering safety link 17 always retains its relative angular position in relation to the door 1 through its rotational degree of freedom about the journal 8.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed:

1. A device for opening a passenger door of an aircraft having a fuselage frame, the device comprising:
   a supporting arm connected movably to the fuselage frame;
   a wishbone connecting the supporting arm to the passenger door;
   a first journal rotatably connecting the wishbone to the supporting arm; and
   a lifting mechanism including:
   a lifting shaft for raising and lowering the door, the lifting shaft including two ends and a roller lever disposed at each end, wherein when the passage door is in the closed position, each roller lever engages a fuselage frame mounting,
   a lowering safety shaft engaged with the lifting shaft, the lowering safety shaft including an end, a roller lever disposed at the end of the lowering safety shaft, and a roller mounted to the roller lever,
   a controllable drive engaged with the lowering safety shaft to rotate the lowering safety shaft, and
   a lowering safety link including a second journal having an elongated configuration, the second journal having a link track, the roller of the lowering safety shaft being guided on the link track of the second journal.

2. The device of claim 1, wherein the lowering safety link is rotatably mounted on the first journal.

3. The device of claim 1, wherein the link track includes a rail for guiding the roller of the lowering safety shaft.

4. The device of claim 1, wherein the lowering safety link, the support arm and the wishbone are rotatable about the axis of the first journal.

5. A device for securing a mechanism for raising a passenger door of an aircraft in a raised state, the mechanism having a supporting arm connected movably to a fuselage frame of the aircraft; a wishbone connecting the supporting arm to the passenger door; a first journal rotatably connecting the wishbone to the supporting arm; and a lifting mechanism having a lifting shaft for raising and lowering the door, the lifting shaft including two ends and a roller lever disposed at each end, wherein when the passage door is in the closed position, each roller lever engages a fuselage frame mounting, a lowering safety shaft engaged with the lifting shaft, the lowering safety shaft including an end, a roller lever disposed at the end of the lowering safety shaft, and a roller mounted to the roller lever, and a controllable drive engaged with the lowering safety shaft to rotate the lowering safety shaft; the device comprising:

a lowering safety link including an second journal having an elongated configuration, the second journal having a link track, the roller of the lowering safety shaft being guided on the link track of the second journal.

6. The device of claim 5, wherein the lowering safety link is rotatably mounted on the first journal.

7. The device of claim 5, wherein the link track includes a rail for guiding the roller of the lowering safety shaft.

* * * * *